United States Patent
Kim et al.

(10) Patent No.: US 10,727,477 B2
(45) Date of Patent: Jul. 28, 2020

(54) CONDUCTIVE MATERIAL DISPERSED LIQUID AND LITHIUM SECONDARY BATTERY MANUFACTURED USING SAME

(71) Applicant: LG Chem, Ltd., Seoul (KR)

(72) Inventors: Ye Lin Kim, Daejeon (KR); Ki Yeon Jo, Daejeon (KR); Jung Keun Yoo, Daejeon (KR); Je Young Kim, Daejeon (KR); Sang Hoon Choy, Daejeon (KR); Jong Heon Seol, Daejeon (KR)

(73) Assignee: LG Chem, Ltd. (KR)

( * ) Notice: Subject to any disclaimer, the term of this patent is extended or adjusted under 35 U.S.C. 154(b) by 267 days.

(21) Appl. No.: 15/738,909

(22) PCT Filed: Oct. 28, 2016

(86) PCT No.: PCT/KR2016/012303
§ 371 (c)(1),
(2) Date: Dec. 21, 2017

(87) PCT Pub. No.: WO2017/099358
PCT Pub. Date: Jun. 15, 2017

(65) Prior Publication Data
US 2018/0175370 A1  Jun. 21, 2018

(30) Foreign Application Priority Data

Dec. 10, 2015  (KR) .................. 10-2015-0176256
Oct. 28, 2016  (KR) .................. 10-2016-0142054

(51) Int. Cl.
*H01M 4/04* (2006.01)
*H01M 4/13* (2010.01)
(Continued)

(52) U.S. Cl.
CPC ............. *H01M 4/133* (2013.01); *H01M 4/04* (2013.01); *H01M 4/13* (2013.01); *H01M 4/131* (2013.01);
(Continued)

(58) Field of Classification Search
CPC .......... H01M 4/04; H01M 4/13; H01M 4/131; H01M 4/133; H01M 4/1391;
(Continued)

(56) References Cited

U.S. PATENT DOCUMENTS

2004/0183014 A1   9/2004  Kagawa
2006/0263588 A1   11/2006 Handa et al.
(Continued)

FOREIGN PATENT DOCUMENTS

JP    S62240339 A    10/1987
JP    2001002729 A    1/2001
(Continued)

OTHER PUBLICATIONS

Extended European Search Report including Written Opinion dated Aug. 10, 2018.
(Continued)

*Primary Examiner* — Brittany L Raymond
(74) *Attorney, Agent, or Firm* — Lerner, David, Littenberg, Krumholz & Mentlik, LLP

(57) ABSTRACT

The present invention provides a conductive material dispersed liquid, including: a conductive material which includes bundle-type carbon nanotubes; a dispersant; a dispersion medium, where a phase angle is in a range of 3° to 18° when measured by a rheometer at a frequency of 1 Hz; and a lithium secondary battery manufactured using the conductive material dispersed liquid. The conductive material dispersed liquid has high solid-like properties, and thus allows the formation of an electrode active material layer (Continued)

having a uniform thickness with no concern for collapse or occurrence of cracks during manufacture of an electrode, and thereby can improve the performance characteristics, particularly capacity characteristics, of a battery.

20 Claims, 4 Drawing Sheets

(51) Int. Cl.
    *H01M 4/133*     (2010.01)
    *H01M 4/1393*     (2010.01)
    *H01M 4/62*     (2006.01)
    *H01M 10/0525*     (2010.01)
    *H01M 4/1391*     (2010.01)
    *H01M 4/131*     (2010.01)

(52) U.S. Cl.
    CPC ....... *H01M 4/1391* (2013.01); *H01M 4/1393* (2013.01); *H01M 4/622* (2013.01); *H01M 4/625* (2013.01); *H01M 10/0525* (2013.01)

(58) Field of Classification Search
    CPC .... H01M 4/1393; H01M 4/622; H01M 4/625; H01M 10/0525
    See application file for complete search history.

(56) References Cited

U.S. PATENT DOCUMENTS

| | | | |
|---|---|---|---|
| 2007/0142621 A1 | 6/2007 | Reif et al. | |
| 2010/0187485 A1 | 7/2010 | Kitano | |
| 2012/0207525 A1 | 8/2012 | Kim et al. | |
| 2013/0065125 A1* | 3/2013 | Sawaki | H01M 4/0404 429/212 |
| 2013/0316160 A1 | 11/2013 | Hata et al. | |
| 2014/0001416 A1 | 1/2014 | Fiffemeier et al. | |
| 2015/0183892 A1 | 7/2015 | Rempel et al. | |
| 2015/0364749 A1* | 12/2015 | Kim | H01M 4/139 252/506 |
| 2016/0326322 A1* | 11/2016 | Obrecht | B01J 31/24 |

FOREIGN PATENT DOCUMENTS

| | | | |
|---|---|---|---|
| JP | 2003142097 A | 5/2003 | |
| JP | 2004281234 A | 10/2004 | |
| JP | 2004281334 A | 10/2004 | |
| JP | 2005075661 A | 3/2005 | |
| JP | 2005116829 A | 4/2005 | |
| JP | 2006310154 A | 11/2006 | |
| JP | 2007169643 A | 7/2007 | |
| JP | 2008050376 A | 3/2008 | |
| JP | 2013054978 A | 3/2013 | |
| JP | 2014107191 A | 6/2014 | |
| JP | 2014203804 A | 10/2014 | |
| JP | 2015003859 A | 1/2015 | |
| JP | 2015526542 A | 9/2015 | |
| JP | 2015178446 A | 10/2015 | |
| KR | 20120071522 A | 7/2012 | |
| KR | 20120093053 A | 8/2012 | |
| KR | 20130132550 A | 12/2013 | |
| KR | 10-2015-0016852 | * | 2/2015 |
| KR | 20150016852 | | 2/2015 |
| KR | 20150072374 A | 6/2015 | |
| WO | 2007004652 A1 | 1/2007 | |
| WO | 2008136347 A1 | 11/2008 | |
| WO | 2015020280 A1 | 2/2015 | |
| WO | 2015093904 A1 | 6/2015 | |
| WO | WO 2015-093904 | * | 6/2015 |

OTHER PUBLICATIONS

International Search Report From PCT/KR2016/012303 dated Feb. 3, 2017.
Kogure, Akira, "Synthetic Rubber," Journal of the Society of Rubber Science and Technology, Feb. 15, 1972, pp. 94-104, vol. 45, No. 2, Japan.
Third Party Observation for JP2018517188 submitted on Oct. 24, 2019.
Chinese Search Report for Application No. 201680040551.8 dated Mar. 30, 2020, 2 pages.
Bauer W, Nötzel D. Rheological properties and stability of NMP based cathode slurries for lithium ion batteries. Ceramics International. Apr. 1, 2014;40(3):4591-8.
Goto T. Rheology control of ceramic slurries for sintering of thin films. Nihon Reoroji Gakkaishi. Jul. 11, 2001;29:205-10.
Noburu, Nakai., "Properties to Determine Appearance of Waterborne Coatings—Relation between Surface Smoothness and Rheological Behavior," Coating Material Research, No. 151, Oct. 2009, pp. 17-22.
Third Party Observation for JP 2018517188 dated May 18, 2020; 5 pages.

* cited by examiner

EXAMPLE 4-1

EXAMPLE 4-2

COMPARATIVE EXAMPLE 4-1

COMPARATIVE EXAMPLE 4-2

COMPARATIVE EXAMPLE 4-3

CONDUCTIVE MATERIAL DISPERSED LIQUID AND LITHIUM SECONDARY BATTERY MANUFACTURED USING SAME

CROSS-REFERENCE TO RELATED APPLICATION

The present application is a national phase entry under 35 U.S.C. § 371 of International Application No. PCT/KR2016/012303, filed on Oct. 28, 2016, which claims priority from Korean Patent Application No. 10-2015-0176256, filed on Dec. 10, 2015, and Korean Patent Application No. 10-2016-0142054, filed on Oct. 28, 2016, the disclosures of which are incorporated herein by reference.

TECHNICAL FIELD

The present invention relates to a conductive material dispersed liquid which allows the formation of an electrode active material layer having a uniform thickness with no concern for collapse or occurrence of cracks during the manufacture of a high loading electrode, thereby improving the performance characteristics of the battery, and a lithium secondary battery manufactured using the same.

BACKGROUND ART

As technological development and demand for mobile devices increase, demand for secondary batteries as energy sources is rapidly increasing. Among these secondary batteries, lithium secondary batteries having a high energy density and voltage, a long cycle life, and a low self-discharge rate are commercially available and widely used. Further, to make an electrode for such a high-capacity lithium secondary battery, research on methods for producing an electrode having a higher energy density per unit volume by improving electrode density has been actively conducted.

Generally, since a high-density electrode is formed by molding electrode active material particles having a size of several μm to several tens of μm using a high-pressure press, particles are deformed, the space between the particles is reduced, and electrolyte permeability may be lowered.

In order to solve such a problem, a conductive material having excellent electrical conductivity and strength is used in the production of electrodes. When a conductive material is used in the production of electrodes, the conductive material is dispersed among the compressed electrode active material, and thereby fine pores are maintained between the active material particles to facilitate the penetration of the electrolyte, and the resistance in the electrode can be lowered due to excellent conductivity. Among such conductive materials, the use of carbon nanotubes, which are fibrous carbon-based conductive materials, capable of further reducing electrode resistance by forming an electrically conductive path in the electrode has been increasing.

The carbon nanotube, which is a type of fine carbon fiber, is tubular carbon having a diameter of 1 μm or less, and is expected to be applied and practically used in various fields due to high conductivity, tensile strength, and heat resistance attributable to the specific structure thereof. However, despite the availability of such carbon nanotubes, the use of carbon nanotubes is limited due to low solubility and dispersibility thereof. Accordingly, in the preparation of electrodes using carbon nanotubes, carbon nanotubes are linearly dispersed in a dispersion medium, and then a composition for forming an electrode is prepared and used.

However, carbon nanotubes do not stably disperse in the dispersion medium, and an aggregation phenomenon occurs due to the strong van der Waals attraction between the carbon nanotubes.

Various attempts have been made to address these issues. Specifically, a method of dispersing carbon nanotubes in a dispersion medium through mechanical dispersion treatment such as ultrasonic treatment has been proposed. However, in this method, dispersibility is excellent while the ultrasonic wave is irradiated, but the carbon nanotubes start to aggregate when the ultrasonic irradiation is finished. Further, a method of dispersing and stabilizing carbon nanotubes using various dispersants has been proposed. However, this method also has a problem in that, when carbon nanotubes are dispersed at a high concentration in a dispersion medium, handling becomes difficult due to an increase in viscosity.

Accordingly, there is a need for development of a method capable of improving the dispersibility of carbon nanotubes in an electrode without reducing conductivity, and a method of preparing a carbon nanotube dispersed liquid which is useful in the production of electrodes using the above-described method.

DISCLOSURE

Technical Problem

A first objective of the present invention is to provide a conductive material dispersed liquid which has high solid-like properties, and thus allows the formation of an electrode active material layer having a uniform thickness with no concern for collapse or occurrence of cracks during the manufacture of a high loading electrode, thereby improving the performance characteristics, particularly capacity characteristics, of a battery, and a method of preparing the conductive material dispersed liquid.

A second objective of the present invention is to provide a composition for forming an electrode of a lithium secondary battery, which includes the conductive material dispersed liquid.

Further, a third objective of the present invention is to provide an electrode for a lithium secondary battery manufactured using the conductive material dispersed liquid, and a lithium secondary battery including the electrode.

Technical Solution

In order to achieve the objectives, according to an embodiment of the present invention, there is provided a conductive material dispersed liquid, including: a conductive material which includes bundle-type carbon nanotubes; a dispersant; and a dispersion medium, wherein a phase angle is in a range of 3° to 18° when measured by a rheometer at a frequency of 1 Hz.

According to another embodiment of the present invention, there is provided a method of preparing the conductive material dispersed liquid which includes mixing a conductive material including bundle-type carbon nanotubes, a dispersant, and a dispersion medium, and then milling such that a phase angle is in a range of 3° to 18° when measured by a rheometer at a frequency of 1 Hz.

According to still another embodiment of the present invention, there is provided a composition for forming an electrode of a lithium secondary battery, which includes the conductive material dispersed liquid.

According to yet another embodiment of the present invention, there are provided an electrode for a lithium secondary battery and a lithium secondary battery manufactured using the conductive material dispersed liquid.

Other details of embodiments of the present invention are incorporated in the detailed description of the invention described below.

Advantageous Effects

A conductive material dispersed liquid according to the present invention has high solid-like properties, and thus allows the formation of an electrode active material layer having a uniform thickness with no concern for collapse and occurrence of cracks during the manufacture of the electrode, and thereby can improve the performance characteristics, particularly capacity characteristics, of the battery. Accordingly, the conductive material dispersed liquid is useful for the production of small-sized batteries for IT devices as well as automobile batteries or the like requiring high capacity characteristics.

DESCRIPTION OF DRAWINGS

The accompanying drawings illustrate a preferred embodiment of the present disclosure and together with the foregoing disclosure, serve to provide further understanding of the technical spirit of the present disclosure, and thus, the present disclosure should not be construed as being limited to the drawings.

BEST MODE OF THE INVENTION

Figure 1:
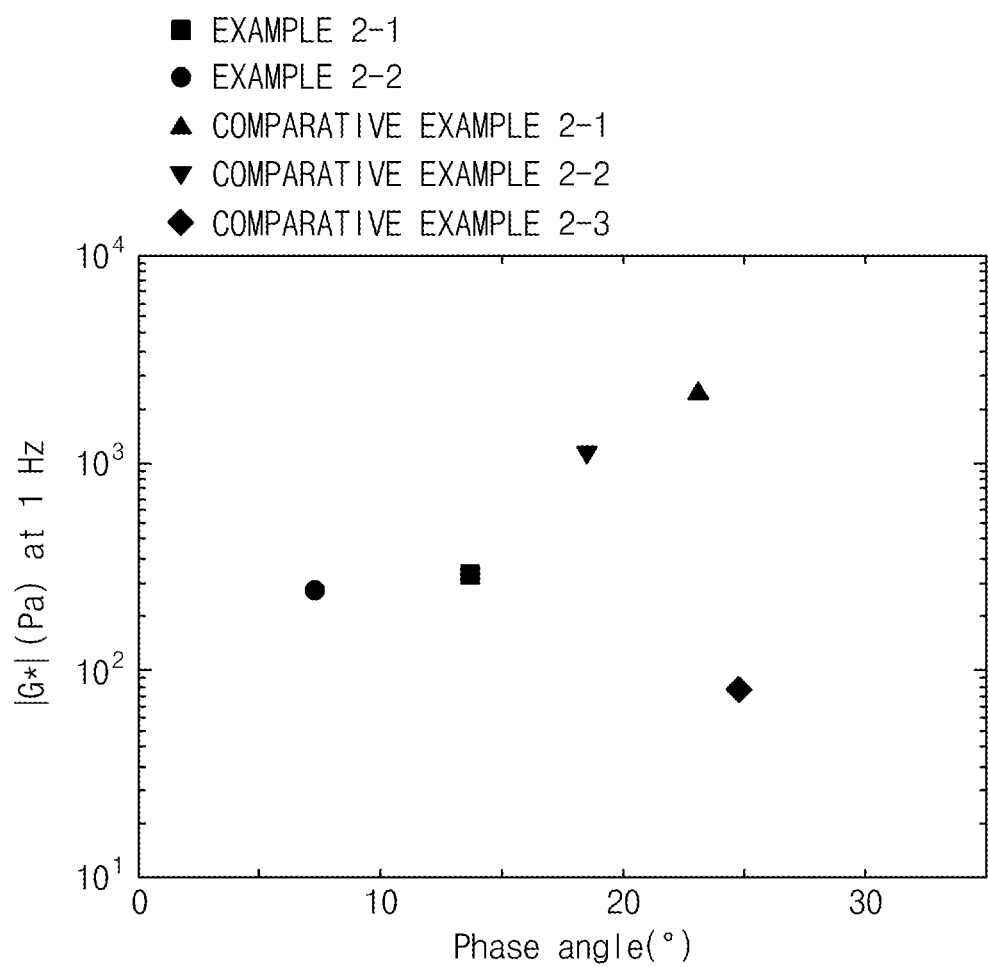
FIG. 1 is a graph of observing a phase angle of conductive material dispersed liquids of Examples 2-1 and 2-2, and Comparative Examples 2-1 to Comparative Example 2-3.

Hereinafter, the present invention will be described in detail in order to facilitate understanding of the present invention.

It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Unless otherwise specified, the term "bundle type" used in the present invention refers to a secondary shape of bundles or ropes in which a plurality of carbon nanotube strands, that is, carbon nanotube units, are arranged such that the axes in the longitudinal direction of the units are arranged in a substantially parallel orientation, or are helically twisted. Further, the term "non-bundle type" or "entangled type" refers to a shape in which a plurality of carbon nanotube units are entangled without a constant shape and not limited to specific orientations.

The term "phase angle (δ)" used in the present invention is derived from the difference between stress and strain applied to an object. The phase angle correlates with the viscoelasticity, and thus is used to reflect the basic properties of the conductive material dispersed liquid of the present invention, which is a viscoelastic material. Here, viscoelasticity means that a material has both viscosity and elasticity, wherein when external energy is applied to a material, energy is converted to thermal energy by viscosity and dissipated, and energy is temporarily stored by elasticity and then leaks out.

Further, ideal solids are elastic materials which store strain energy and are restored to the original shape when strain is removed. The stress of an ideal solid is proportional to the amplitude of the strain applied, and the difference in phase angle between stress and strain is 0°. Ideal liquids are viscous materials, which emit strain energy and cannot be restored to the original shape when strain is removed. The stress of the ideal liquid is proportional to the applied strain rate and the difference in phase angle between stress and strain is 90°.

In the present invention, the phase angle of the conductive material dispersed liquid may be measured using a rheometer by methods known in the related field, and specifically, may be measured by performing a frequency sweep using each frequency from 0.62 to 62 rad/s while applying a certain amount of strain, for example 1% of stress, particularly, 1% of stress of a strain rate in the linear viscoelastic region, at a temperature of 15 to 25° C. using a dynamic shear rheometer (DSR). Moreover, the measurement may be performed with frequency sweeps using each frequency from 0.1 to 10 Hz. The smaller the measured phase angle is, the more dominant the elasticity is, and the larger the phase angle becomes, the more dominant the viscosity is.

Studies are underway for manufacturing high loading electrodes in accordance with demand for improved energy per weight for the expansion of the supply of high-energy-density lithium secondary batteries. In order to manufacture high loading electrodes, a method of applying a conductive material having high conductivity and increasing the proportion of an active material through a decrease in the amount of binder is generally considered. To this end, a conductive material dispersion having suitable viscosity, dispersibility, and coating stability is required.

However, when carbon nanotubes are applied in the form of a dispersion liquid in a composition for forming a high loading electrode in order to reduce resistance and improve dispersibility, there is a problem in that the viscosity and elasticity of the composition deteriorate due to a decrease in the solid content and a decrease in the amount of binder. Further, the composition for forming an electrode is rapidly changed over time during coating, and it is difficult to secure coating stability due to severe lifting of the binder. As a result, a crack or collapse occurs during the formation of the electrode active material layer.

Accordingly, the present invention provides a conductive material dispersed liquid which has high solid-like properties which are advantageous for the formation of high-loading electrodes due to control of the phase angle of the conductive material dispersed liquid, and thus has excellent coating stability and allows uniform coating by using a conductive material including bundle-type carbon nanotubes during the manufacture of electrodes.

That is, the conductive material dispersed liquid according to an embodiment of the present invention includes: a conductive material which includes bundle-type carbon nanotubes; a dispersant; and a dispersion medium, wherein a phase angle is in a range of 3° to 18° when measured by a rheometer at a frequency of 1 Hz.

In the conductive material dispersed liquid according to an embodiment of the present invention, a phase angle (δ) is in the range of 3° to 18° when measured by a rheometer at a frequency of 1 Hz. When the phase angle of the conductive material dispersed liquid is less than 3°, it is difficult to uniformly disperse the conductive material in the slurry at the time of coating due to excessively high solid-like properties. When the phase angle exceeds 18°, it is difficult to form an active material layer having a uniform thickness during the manufacture of high-loading electrodes due to low viscosity attributable to high liquid-like properties, and thus there is a concern that cracks may occur in the drying process. Considering the solid-like properties of the conductive material dispersed liquid according to control of the phase angle of the conductive material dispersed liquid, and coating properties and coating stability during the manufacture of electrodes using the conductive material dispersed liquid, the phase angle of the conductive material dispersed liquid may be specifically in the range of 3° to 15°, and more specifically in the range of 3° to 10°.

Generally, a liquid has no restoring force to deformation, that is, no elastic deformation when external force is applied. A solid cannot continuously deform when external force is applied. However, since the conductive material dispersed liquid according to an embodiment of the present invention is a material having viscoelastic characteristics, the shape can be deformed when an external force is applied, and the material can be restored to the original shape thereof regardless of the number of applied forces. While the viscoelasticity of the conductive material dispersed liquid according to an embodiment of the present invention may vary depending on external conditions such as stress, strain, time scale, temperature, and the like, the phase angle (δ) is in the range of 3° to 18° when measured by a rheometer at a frequency of 1 Hz.

The phase angle of the conductive material dispersed liquid as described above may be realized by control of the conditions during the milling process in the preparation process of the conductive material dispersed liquid and control of the type, physical properties, and mixing ratio of the conductive material, the dispersant, and the dispersion medium forming the conductive material dispersed liquid.

Further, physical properties of carbon nanotubes may vary depending on the crystallinity, structure, and morphology of units forming carbon nanotubes, the structure and morphology of secondary particles formed of the units, the content of metal elements contained in carbon nanotubes, etc. Accordingly, the physical properties required depending on the use of the carbon nanotubes can be obtained by controlling one or a combination of two or more of these factors.

Specifically, in the conductive material dispersed liquid according to an embodiment of the present invention, the conductive material includes bundle-type carbon nanotubes.

The carbon nanotube is a secondary structure formed by aggregating carbon nanotube units such that carbon nanotube units are fully or partially bundled. The carbon nanotube unit has graphite sheets in a cylinder form with nano-sized diameters and having sp2 bond structures. According to the rolling angles and structures of the graphite sheets, the carbon nanotube units show conductive or semiconductive characteristics. The carbon nanotube units may be classified into single-walled carbon nanotubes (SWCNT), double-walled carbon nanotubes (DWCNT), and multi-walled carbon nanotubes (MWCNT) according to the number of bonds forming walls. The carbon nanotube units have lower resistance as the walls thereof are thinner.

In the conductive material dispersed liquid according to an embodiment of the present invention, the carbon nanotubes may include one or two or more of single-walled, double-walled, and multi-walled carbon nanotube units in the conductive material dispersed liquid according to an embodiment of the present invention.

Further, when the diameter of the carbon nanotube unit as a conductive material for a lithium secondary battery is excessively large, the number of absolute strands per volume decreases and the amount of the conductive material used increases, and thus it is difficult to produce an electrode with high energy density. Further, the pore diameter of the electrode is also greatly increased, and thus electrode density may be lowered. Further, when the diameter of the carbon nanotube unit is excessively small, dispersion becomes difficult and manufacturing processability of a dispersed liquid decreases, and since dispersed carbon nanotube units or carbon nanotubes are inserted in the space between the electrode active material particles, it is difficult to form sufficient pores. Accordingly, the average strand diameter of the carbon nanotube unit of carbon nanotubes usable in the present invention may be 30 nm or less, and the average strand diameter of the carbon nanotube unit may be in the range of 10 to 30 nm considering the effect of improving the dispersibility and solid-like properties of the conductive material by controlling unit diameter which results in improving the coating stability of the composition for forming an electrode. The carbon nanotube unit refers to one strand of carbon nanotubes.

Further, the longer the length of the carbon nanotube unit is, the higher the electrical conductivity, strength, and lifetime characteristics at room temperature and high temperature. When the length of the carbon nanotube unit is too short, it is difficult to form a conductive path efficiently, and thus there is a concern that electrical conductivity may decrease. Meanwhile, when the length of the carbon nanotube unit is excessively long, the dispersibility of the carbon nanotubes may be lowered. Accordingly, the length of the unit of carbon nanotubes usable in the present invention may be in the range of 0.5 to 200 μm. Further, in consideration of the diameter of the carbon nanotube unit, the carbon nanotube unit may have an aspect ratio of 5 to 50,000, and more specifically 10 to 20,000, which is defined as a ratio of the length (the length of the long axis passing through the center of the unit) to the diameter (the length of the short axis perpendicular to the long axis and passing through the center of the unit) of the carbon nanotube unit.

In the present invention, the strand diameter and length of the carbon nanotube unit may be measured using a field emission scanning electron microscope.

Moreover, carbon nanotubes including the carbon nanotube unit may have a ratio (TD/BD ratio) of a true density (TD) to a bulk density (BD) in the range of 70 to 120.

In the present invention, the internal structure of the carbon nanotube may be predicted from the TD/BD ratio. When the TD/BD ratio is excessively high, the content of the carbon nanotube unit in the carbon nanotube is low, and thus capacity characteristics of the battery may deteriorate. When the TD/BD ratio is too small, the dispersibility of the carbon nanotubes may be lowered. The TD/BD ratio of the carbon nanotubes usable in the present invention may be, more specifically, in the range of 70 to 100 considering the effects of improving the dispersibility and battery properties, and further considering the effect of improving the solid-like properties according to control of the ratio of the bulk density and true density.

Specifically, the true density of the carbon nanotubes usable in the present invention may be in the range of 1,800 to 2,200 kg/m$^3$, and more specifically, in the range of 1,900 to 2,200 kg/m$^3$ under the conditions satisfying the above TD/BD ratio.

Further, the bulk density of the carbon nanotubes may be in the range of 10 to 50 kg/m$^3$, and more specifically in the range of 20 to 40 kg/m$^3$ under the conditions satisfying the above TD/BD ratio. When the carbon nanotubes have a bulk density within the above-described range, the conductivity and dispersibility of the carbon nanotubes may be improved.

In the present invention, the bulk density of the carbon nanotubes may be defined by the following Equation 1. Specifically, after powder is filled in a 25 ml container of known weight and then weighed, the density may be converted by the following Equation 1.

Bulk density (kg/m$^3$)=Weight of carbon nanotubes (kg)/Volume of carbon nanotubes (m$^3$)  [Equation 1]

Further, in the conductive material dispersed liquid according to an embodiment of the present invention, the carbon nanotube has a small unit average diameter as described above, and has a high BET specific surface area due to the high TD/BD ratio, and can exhibit excellent dispersibility. Specifically, a BET specific surface area of the carbon nanotubes usable in the present invention may be in the range of 180 to 300 m$^2$/g, specifically in the range of 200 to 300 m$^2$/g, and more specifically in the range of 230 to 300 m$^2$/g.

In the present invention, the specific surface area of the carbon nanotubes is measured by a BET method. Specifically, the specific surface area of the carbon nanotubes may be calculated from an amount of nitrogen gas adsorbed at a liquid nitrogen temperature (77K) using BELSORP-mini II manufactured by BEL JAPAN, INC.

Further, in the conductive material dispersed liquid according to an embodiment of the present invention, the carbon nanotubes may have an average value in the range of 0.7 to 1.2 of a ratio (ID/IG) of a maximum peak intensity (ID) of a D band at 1,360±50 cm$^{-1}$ to a maximum peak intensity (IG) of a G band at 1,580±50 cm$^{-1}$ obtained by Raman spectroscopy using a laser having a wavelength of 532 nm.

Raman spectroscopy is a method for analyzing the structure of carbon nanotubes, and also is a useful method for analysis of the surface state of carbon nanotubes. The peak in the region around a wavenumber of 1,570~1,580 cm$^{-1}$ in the Raman spectra of carbon nanotubes is called a G band, which is a peak showing an sp$^2$ bond of carbon nanotubes and represents a carbon crystal with no structural defects. Further, the peak in the region around a wavenumber of 1,350~1,360 cm$^{-1}$ in the Raman spectra of carbon nanotubes is called a D band, which is a peak showing an sp$^3$ bond of carbon nanotubes and increases when the atomic bond formed by the sp$^2$ bond is broken and becomes the sp$^3$ bond. Since the D band increases when disorder or defects present in the carbon nanotube, or the amorphous carbon are generated, the degree of generated disorder or defects may be quantitatively evaluated by calculating the ratio (ID/IG) of the maximum peak intensity (ID) of the D band to the maximum peak intensity (IG) of the G band.

In the present invention, the G band of Raman spectra for carbon nanotubes may be a peak in the region of the wavenumber of 1,580±50 cm$^{-1}$, and the D band may be a peak in the region of the wavenumber of 1,360±50 cm$^{-1}$. The wavenumber range for the G band and D band corresponds to a range that may be shifted according to a laser light source used in Raman spectroscopy. The Raman values used in the present invention are not particularly limited, and may be measured at a laser wavelength of 532 nm using a DXR Raman microscope (Thermo Electron Scientific Instruments LLC).

Generally, the larger the ratio of a G band peak integral and a D band peak integral, the larger the amount of amorphous carbon or the poorer the crystallinity of the carbon nanotube, but in the present invention, since the BET specific surface area of carbon nanotubes is increased and carbon nanotubes have a secondary shape with a bundle structure, carbon nanotubes have excellent crystallinity and have the average value of ID/IG as described above.

Further, the carbon nanotubes may include Fe metal elements in an amount of 50 ppm or less, more specifically 20 ppm or less in a main catalyst or a cocatalyst used in the production process. As such, when the content of Fe metal elements as a residual impurity in the carbon nanotubes is remarkably reduced, an electrode can exhibit better conductivity without concern for side reactions in the electrode. In the present invention, the content of residual metal impurities in the carbon nanotubes may be analyzed using inductively coupled plasma (ICP). Further, the carbon nanotubes may not include Fe.

The carbon nanotubes as described above may be commercially obtained and used, or may be directly prepared and used. When the carbon nanotubes are prepared, the carbon nanotubes may be prepared by a conventional method such as an arc discharge method, a laser evaporation method, or a chemical vapor deposition method. The above-described physical properties may be realized by controlling the type of the catalyst, the temperature of the heating process, and the impurity removal process.

Specifically, when carbon nanotubes are prepared by a chemical vapor phase synthesis method, the carbon nanotubes may be prepared by a method which includes a step of contacting a carbon source under heating with a supported catalyst in which a metal catalyst is supported on a spherical α-alumina support to prepare the carbon nanotubes, and a step of selectively removing metal impurities in carbon nanotubes as necessary.

More specifically, preparation of carbon nanotubes according to the chemical vapor phase synthesis method may be performed by introducing the supported catalyst into a horizontal fixed-bed reactor or a fluidized-bed reactor, and then injecting a carbon source or a mixed gas of the carbon source, a reducing gas (e.g., hydrogen or the like), and a carrier gas (e.g., nitrogen) thereinto from a temperature not lower than the pyrolysis temperature of the gaseous carbon source to a temperature not higher than the melting point of the metal catalyst supported on the support catalyst, and decomposing the carbon source to grow carbon nanotubes by the chemical vapor phase synthesis method. The carbon nanotubes prepared by the chemical vapor phase synthesis method have a crystal growth direction almost parallel to the axis of the carbon nanotube unit and high crystallinity of the graphite structure in the longitudinal direction of the carbon nanotube unit. As a result, the unit has a small diameter, and high electric conductivity and strength.

Further, a heating process in the preparation of the carbon nanotubes may be performed at a temperature in the range of 500 to less than 800° C., and more specifically, 550 to 700° C. Within this temperature range, the generation of amorphous carbon is minimized, and the weight is lowered while maintaining the bulk size of the carbon nanotubes prepared, and thus the dispersibility according to the reduction of the bulk density can be further improved. As a heat source for the heating process, induction heating, radiant heat, laser, IR, microwave, plasma, surface plasmon heating, or the like may be used.

Further, carbon may be supplied as a carbon source, and any carbon source may be used without particular limitation as long as it can be present in a gas phase at a temperature of 300° C. or more. More specifically, the carbon source may be a carbon-based compound having 6 or less carbon atoms, and more specifically, examples thereof include carbon monoxide, methane, ethane, ethylene, ethanol, acetylene, propane, propylene, butane, butadiene, pentane, pentene, cyclopentadiene, hexane, cyclohexane, benzene, toluene, and the like, and one or a mixture of two or more thereof may be used.

A cooling process for arranging the carbon nanotube units more regularly may be further performed after carbon nanotube units are grown by the heating process as described above. Specifically, the cooling process may be performed by natural cooling according to removal of a heat source, or using a cooling device.

Further, the supported catalyst used in the preparation of the carbon nanotubes may be a catalyst in which a metal catalyst is supported on a spherical α-alumina support.

The α-alumina has very low porosity as compared with γ-alumina and has a low utility value as a catalyst support. However, when a calcination temperature at which the supported catalyst is formed is controlled, it is possible to increase the diameter of carbon nanotubes by reducing the specific surface area of carbon nanotubes while suppressing the generation of amorphous carbon in the synthesis of carbon nanotubes using the α-alumina. Moreover, the bulk density of carbon nanotubes may be reduced to improve dispersibility Specifically, the α-alumina usable as a support in the present invention may have an average particle diameter ($D_{50}$) in the range of 20 to 200 μm, and may have a BET specific surface area in the range of 1 to 50 $m^2/g$. Further, the α-alumina may have a smooth surface with very low porosity, and specifically, a porosity in the range of 0.001 to 0.1 $cm^3/g$.

Further, the supported catalyst including the spherical α-alumina as a support may be prepared by supporting a metal catalyst on the spherical α-alumina followed by calcination. Specifically, the supported catalyst may be prepared by adding the spherical α-alumina support to a metal catalyst precursor solution prepared by dissolving the precursor of the metal catalyst in water, mixing, and then performing calcination at a temperature of 600° C. or less.

The metal catalyst supported on the support serves to help carbon components present in a gaseous carbon source bind to each other to form a 6-membered ring structure. As the metal catalyst, a main catalyst such as iron, nickel or cobalt may be used alone or the main catalyst may be used in the form of a main catalyst-cocatalyst composite catalyst together with a co-catalyst such as molybdenum, vanadium or chromium. Specifically, the composite catalyst may be FeCO, CoMo, CoV, FeCoMo, FeMoV, FeV, FeCoMoV, or the like, and one or a mixture of two or more thereof may be used. Further, the cocatalyst may be used in an amount of 0.01 to 1 mole, and specifically 0.05 to 0.5 moles based on 1 mole of the main catalyst.

As the precursor of the metal catalyst which may be used in the preparation of the supported catalyst, a metal salt or metal oxide soluble in water may be used. Specifically, the precursor of the metal catalyst may be a metal salt, a metal oxide or a metal halide including one or two or more metal elements selected from Ni, Co, Mo, V, and Cr, and one or a mixture of two or more thereof may be used. More specifically, one or a mixture of two or more selected from the group consisting of $Co(NO_3)_2.6H_2O$, $Co_2(CO)_8$, $[Co_2(CO)_6(t\text{-}BuC{=}CH)]$, $Cu(OAc)_2$, $Ni(NO_3)_2.6H_2O$, $(NH_4)_6Mo_7O_{24}.4H_2O$, $Mo(CO)_6$, $(NH_4)MoS_4$, and $NH_4VO_3$ may be used.

Further, the precursor of the metal catalyst may be used in the form of an aqueous solution dissolved in water. Here, the concentration of the metal catalyst precursor in the aqueous solution may be suitably controlled in consideration of the impregnation efficiency and the like. Specifically, the concentration of the metal catalyst precursor in the aqueous solution may be in the range of 0.1 to 0.4 g/ml.

Further, the content of the spherical α-alumina support mixed with the precursor of the metal catalyst may be suitably determined in consideration with the content of the support in the supported catalyst to be finally prepared.

Further, acid may be selectively further used in the addition and mixing of the support in the metal catalyst precursor solution for controlling the bulk density of the carbon nanotubes to be finally prepared. As such, when the acid is further added, the metal catalyst precursor solution may be used in an amount of 3 to 40 moles, and more specifically 5 to 30 moles based on 1 mole of the acid. The acid may specifically be citric acid or the like, and one or a mixture of two or more thereof may be used.

Further, a process of mixing the metal catalyst precursor solution and the spherical α-alumina support may be performed according to a conventional method, and specifically, may be performed by rotation or stirring at a temperature in the range of 45 to 80° C.

Further, during the mixing process, the metal catalyst precursor and the support may be mixed in consideration of the content of the metal catalyst supported on the supported catalyst to be finally prepared. As the amount of the metal catalyst supported on the supported catalyst increases, the bulk density of the carbon nanotubes prepared using the supported catalyst tends to increase. Accordingly, the metal catalyst may be mixed such that the metal catalyst is supported in an amount of 5 to 30 wt % based on the total weight of the supported catalyst to be finally prepared, considering the bulk density of the carbon nanotubes prepared.

Further, after the metal catalyst precursor solution and the spherical α-alumina support are mixed, a drying process may be selectively performed before the subsequent calcination process. The drying process may be carried out according to a conventional method, and specifically, may be carried out by rotary evaporation at a temperature in the range of 40 to 100° C. under vacuum for 3 minutes to 1 hour.

Subsequently, calcination is performed on the mixture of the metal catalyst precursor and the support prepared in the aforementioned manner. The calcination may be carried out at a temperature of 600° C. or less, and specifically in the range of 400° C. to 600° C. in air or an inert atmosphere.

Further, after the drying process and before the calcination process, a preliminary calcination process may selectively be further carried out at a temperature in the range of 250 to 400° C.

Here, considering the efficiency of the reaction, up to 50% of the mixture of the metal catalyst precursor and the support may be impregnated into the α-alumina support and used immediately before the preliminary calcination process, and the remainder of the mixture immediately after the preliminary calcination process may be impregnated into the α-alumina support and used.

The carbon nanotubes prepared by a manufacturing process as described above may selectively be further subjected to a removal process for removing metal impurities derived from the metal catalyst, and the metal impurity removal process may be performed according to a conventional method such as washing and acid treatment.

The bundle-type carbon nanotubes prepared according to the above-described preparation method have excellent conductivity, and the effects of improving dispersibility and solid-like properties of the conductive material, and the resulting effect of improving coating stability of the composition for forming an electrode can be exhibited when the conductive material dispersed liquid is prepared. Further, since the bundle-type carbon nanotubes have high purity to increase the conductivity in the electrode, the performance of the battery, particularly the output characteristics of the battery can be improved when being applied to a battery.

Further, in the conductive material dispersed liquid according to an embodiment of the present invention, any dispersant may be used without particular limitation as long as the dispersant is generally used to improve the dispersibility of the carbon nanotubes.

Specifically, in the conductive material dispersed liquid according to an embodiment of the present invention, the dispersant may be a nitrile-based rubber, and more specifically, may be a partially or wholly hydrogenated nitrile butadiene-based rubber.

Specifically, the hydrogenated nitrile butadiene-based rubber may include a structural unit derived from a hydrogenated conjugated diene, a structural unit derived from an α,β-unsaturated nitrile, and a structural unit derived from a conjugated diene, and may include the structural unit derived from a hydrogenated conjugated diene in an amount of 20 to 80 wt % based on the total weight of the rubber. When the structural unit derived from a hydrogenated conjugated diene is contained in the afore-mentioned amount, the miscibility with the dispersion medium is increased and the dispersibility of carbon nanotubes can be increased. Further, the solid-like properties of the conductive material dispersed liquid are also increased, and thereby the coating stability of the composition for forming an electrode can be improved. More specifically, the structural unit derived from a hydrogenated conjugated diene may be included at 30 to 70 wt % based on the total weight of the rubber.

Further, considering the improvement of dispersibility of carbon nanotubes and the miscibility with the dispersion medium, the content of the structural unit derived from an α,β-unsaturated nitrile in the hydrogenated nitrile butadiene-based rubber may be in the range of 10 to 70 wt %, and specifically in the range of 20 to 60 wt % based on the total weight of the rubber. When the structural unit derived from an α,β-unsaturated nitrile is contained in the afore-mentioned amount, the dispersibility of carbon nanotubes can be increased, and thus the solid-like properties of the conductive material dispersed liquid can be increased.

Considering the effects of improving the solid-like properties of the conductive material dispersed liquid by controlling the content of the repeating unit structure forming the rubber and the effect of improving the coating stability of the composition for forming an electrode including the conductive material dispersed liquid, the hydrogenated nitrile butadiene-based rubber may be a partially hydrogenated nitrile butadiene-based rubber including a structural unit derived from a hydrogenated conjugated diene at 20 to 80 wt %; a structural unit derived from α,β-unsaturated nitrile at 10 to 70 wt %; and a structural unit derived from a conjugated diene at 1 to 15 wt % based on the total weight of the rubber.

In the present invention, the content of the repeating unit containing a nitrile structure in the hydrogenated nitrile butadiene-based rubber is the weight ratio of the structural unit derived from an α,β-unsaturated nitrile with respect to the total weight of the rubber, and the measurement of the content is performed by obtaining a median of the values obtained by measuring the amount of nitrogen generated, converting the bonding amount from the molecular weight of acrylonitrile, and quantifying in accordance with the mill oven method of JIS K 6364.

Further, the hydrogenated nitrile butadiene-based rubber may be prepared by copolymerizing α,β-unsaturated nitriles, conjugated dienes, and, selectively, other copolymerizable termonomers, and hydrogenating C=C double bonds in the copolymer thus prepared. Here, the polymerization reaction process and hydrogenation process may be carried out according to a conventional method.

Specific examples of the α,β-unsaturated nitrile usable in the preparation of the hydrogenated nitrile butadiene-based rubber include acrylonitrile, methacrylonitrile or the like, and one or a mixture of two or more thereof may be used.

Further, specific examples of the conjugated dienes usable in the preparation of the hydrogenated nitrile butadiene-based rubber include conjugated dienes having 4 to 6 carbon atoms such as 1,3-butadiene, isoprene, 2,3-dimethyl-1,3-butadiene, and the like, and one or a mixture of two or more thereof may be used.

Further, specific examples of other copolymerizable termonomers which may be selectively used include aromatic vinyl monomers (e.g., styrene, α-methyl styrene, vinyl pyridine, fluoroethyl vinyl ether, etc.), α,β-unsaturated carboxylic acids (e.g., acrylic acid, methacrylic acid, maleic acid, fumaric acid, etc.), esters or amides of α,β-unsaturated carboxylic acids (e.g., methyl (meth)acrylate, ethyl (meth)acrylate, n-dodecyl (meth)acrylate, methoxymethyl (meth)acrylate, hydroxyethyl (meth)acrylate, polyethylene glycol (meth)acrylate, etc.), and anhydrides of α,β-unsaturated dicarboxylic acids (e.g., maleic anhydride, itaconic anhydride, citraconic anhydride, etc.), but are not limited thereto.

In the hydrogenated nitrile butadiene-based rubber prepared according to the aforementioned method, the content ratio of a structural unit derived from a hydrogenated conjugated diene, a structural unit derived from an α,β-unsaturated nitrile, a structural unit derived from a conjugated diene, and a selectively used structural unit derived from other copolymerizable termonomers may vary within a wide range, but the total sum of the structural units is 100 wt % in each case.

Further, the hydrogenated acrylonitrile-butadiene rubber (H-NBR) may have a weight average molecular weight in the range of 10,000 to 700,000 g/mol, and more specifically in the range of 10,000 to 300,000 g/mol. Further, the partially hydrogenated acrylonitrile-butadiene rubber (H-NBR) may have a polydispersity index (PDI) (a ratio of Mw/Mn, where Mw is a weight average molecular weight and Mn is a number average molecular weight) in the range of 2.0 to 6.0, and specifically 2.0 to 4.0. When the H-NBR has a weight average molecular weight and polydispersity index within the aforementioned ranges, the conductive material comprising the carbon nanotubes may be uniformly dispersed in the dispersion medium. In the present invention, each of the weight average molecular weight and the number average molecular weight is a polystyrene-equivalent molecular weight analyzed by gel permeation chromatography (GPC).

Further, in the conductive material dispersed liquid according to an embodiment of the present invention, examples of the dispersion medium include amide-based polar organic solvents such as dimethylformamide (DMF), diethylformamide, dimethylacetamide (DMAc), N-methylpyrrolidone, (NMP) and the like; alcohols such as methanol, ethanol, 1-propanol, 2-propanol (isopropyl alcohol), 1-butanol (n-butanol), 2-methyl-1-propanol (isobutanol), 2-butanol (sec-butanol), 1-methyl-2-propanol (tert-butanol), pentanol, hexanol, heptanol, octanol, and the like; glycols such as ethylene glycol, diethylene glycol, triethylene glycol, propylene glycol, 1,3-propanediol, 1,3-butanediol, 1,5-pentanediol, hexylene glycol, and the like; polyhydric alcohols such as glycerin, trimethylol propane, pentaerythritol, sorbitol, and the like; glycol ethers such as ethylene glycol monomethyl ether, diethylene glycol monomethyl ether, triethylene glycol monomethyl ether, tetraethylene glycol monomethyl ether, ethylene glycol monoethyl ether, diethylene glycol monoethyl ether, triethylene glycol monoethyl ether, tetraethylene glycol monoethyl ether, ethylene glycol monobutyl ether, diethylene glycol monobutyl ether, triethylene glycol monobutyl ether, tetraethylene glycol monobutyl ether, and the like; ketones such as acetone, methyl ethyl ketone, methyl propyl ketone, cyclopentanone, and the like; and esters such as ethyl acetate, γ-butyllactone, ε-propiolactone and the like, and one or a mixture of two or more thereof may be used. More specifically, the dispersion medium may be an amide-based polar organic solvent considering the effect of improving the dispersibility of the carbon nanotubes and the dispersant.

In the conductive material dispersed liquid having the above-described composition according to an embodiment of the present invention, the contents of the dispersant, the conductive material including bundle-type carbon nanotubes and the dispersion medium may be suitably determined depending on the use of the dispersion liquid.

Specifically, the dispersant may be contained in an amount of 1 to 50 parts by weight based on 100 parts by weight of the carbon nanotubes in order to uniformly disperse the carbon nanotubes in the dispersion liquid. When the content of the dispersant is less than 1 part by weight, it is difficult to uniformly disperse the carbon nanotubes in the dispersion liquid. When the amount exceeds 50 parts by weight, viscosity of the dispersion liquid may increase, and thus there is a concern that coating properties and coating stability of the composition for forming an electrode may decrease during manufacture of the electrode.

Further, the carbon nanotubes may be included in an amount of 1.0 to 33 wt % based on the total weight of the conductive material dispersed liquid. When the carbon nanotubes are included in an amount within the above-described range, electronic conductivity and dispersibility can be well balanced. When the content of carbon nanotubes is out of the above-described range and is less than 1 wt %, for example, the composition for forming an electrode includes a large amount of organic solvent while being used to prepare an electrode of a lithium secondary battery, and as a result, pores in the electrode are increased, a filling rate of an active material is lowered, and thereby battery capacity may decrease. Further, a drying time for removing the organic solvent may be prolonged. Moreover, when the content of carbon nanotubes exceeds 33 wt %, the mixing dispersibility of the carbon nanotubes decreases, and thus there is a concern that coating properties and coating stability of the composition for forming an electrode may decrease during the manufacture of the electrode. More specifically, the carbon nanotubes may be included at 1 to 8 wt % based on the total weight of the conductive material dispersed liquid.

More specifically, the conductive material dispersed liquid according to an embodiment of the present invention may include the dispersant at 1 to 50 parts by weight and the dispersion medium at 200 to 9,900 parts by weight based on 100 parts by weight of the carbon nanotubes. When the conditions of the content ratio are satisfied, the condition of the phase angle is satisfied, and thus high solid-like properties can be exhibited, thereby significantly improving coating properties and coating stability of the composition for forming an electrode.

Further, the conductive material dispersed liquid according to an embodiment of the present invention may further include a dispersion stabilizer to increase stability of the dispersed liquid.

The dispersion stabilizer is adsorbed on the surface of carbon nanotubes to exhibit a lapping effect surrounding the carbon nanotubes, thereby preventing aggregation of the carbon nanotubes. Accordingly, the dispersion stabilizer has excellent affinity for carbon nanotubes and excellent miscibility with dispersants and dispersion media.

Specifically, in the conductive material dispersed liquid according to an embodiment of the present invention, the dispersion stabilizer may be fluorinated polymers such as polyvinylidene fluoride or polyvinylpyrrolidone, and one or a mixture of two or more thereof may be used.

Further, the dispersion stabilizer may have a weight average molecular weight in the range of 20,000 to 5,000,000 g/mol. When the molecular weight of the dispersion stabilizer is too small and is less than 20,000 g/mol, it is difficult for the dispersion stabilizer to have a sufficient lapping effect on the carbon nanotubes. When the molecular weight is too large and is more than 5,000,000 g/mol, it is difficult to sufficiently lap the carbon nanotubes due to a decrease in molecular motion of the dispersion stabilizer in the dispersion medium. More specifically, the dispersion stabilizer may have a weight average molecular weight in the range of 70,000 to 2,000,000 g/mol.

Further, the dispersion stabilizer may be used in an amount of 1 to 10 parts by weight based on 100 parts by weight of the carbon nanotubes. When the content of the dispersion stabilizer is too low in comparison with the content of the carbon nanotubes, it is difficult to obtain a sufficient lapping effect, and as a result, aggregation of carbon nanotubes may occur.

The conductive material dispersed liquid having the above-described composition according to an embodiment of the present invention may be prepared by a method including mixing a conductive material including bundle-type carbon nanotubes, a dispersant, and a dispersion medium, and then milling such that a phase angle is in a range of 3° to 18° when measured by a rheometer at a frequency of 1 Hz. Here, the type and use amount of the carbon nanotubes, the conductive material including the carbon nanotubes, dispersant, and dispersion medium are the same as described above.

Mixing of the conductive material, dispersant and dispersion medium may be performed by a conventional method. Specifically, cavitation dispersion treatment may be carried out to improve the mixing property of the carbon nanotubes and dispersion medium, or the dispersibility of the carbon nanotubes in the dispersion medium. The cavitation dispersion treatment is a dispersion treatment method using a shock wave generated by the rupture of vacuum bubbles formed in water when high energy is applied to a liquid, and the carbon nanotubes may be dispersed without deteriorating the properties thereof by the above-described method. Specifically, the cavitation dispersion treatment may be carried out by an ultrasonic wave, a jet mill, or shear dispersion treatment.

The dispersion treatment process may be suitably performed depending on the amount of carbon nanotubes and the type of dispersant. Specifically, when the ultrasonic treatment is performed, the frequency may be in the range of 10 to 150 kHz, the amplitude may be in the range of 5 to 100 μm, and the irradiation time may be in the range of 1 to 300 minutes. As the ultrasonic wave generating apparatus for performing the ultrasonic treatment process, for example, an ultrasonic homogenizer may be used. Further, when a jet mill process is carried out, the pressure may be 20 to 250 MPa, and may be carried out more than once, and specifically, twice or more. Further, a high pressure wet jet mill or the like may be used as the jet mill dispersing apparatus.

The temperature during the cavitation dispersion treatment process is not particularly limited, and the cavitation dispersion treatment may be performed at a temperature at which there is no possibility of a change in viscosity of the dispersed liquid due to evaporation of the dispersion medium. Specifically, the cavitation dispersion treatment may be performed at a temperature of 50° C. or less, and more specifically, at a temperature in the range of 15 to 50° C.

Further, in the preparation of the conductive material dispersed liquid according to an embodiment of the present invention, milling may be carried out by a method such as ball milling, bead milling, or basket milling. More specifically, milling may be performed by a milling method using a bead mill.

Further, in milling using the bead mill, the size of the bead mill may be suitably determined according to the type and amount of the conductive material and the type of dispersant, and specifically, the diameter of the bead mill may be in the range of 0.5 to 2 mm, and more specifically in the range of 1 to 2 mm. Further, a bead milling process may be performed at a rate of 2,000 to 4,500 rpm, and more specifically 2,000 to 3,000 rpm.

The milling process may be performed under the condition in which the phase angle of the conductive material dispersed liquid satisfies the above-described condition, and specifically, may be performed for 60 to 120 minutes, and more specifically for 60 to 90 minutes.

Further, a dispersion stabilizer may selectively be further used in the preparation of the dispersed liquid, and the dispersion stabilizer may be added together during the process of mixing with the dispersant. In this case, the method of preparing the conductive material dispersed liquid according to an embodiment of the present invention may further include a process of adding a dispersion stabilizer. The type and use amount of the dispersion stabilizer are as described above.

According to the above-described preparation method, a conductive material dispersed liquid having high solid-like properties and in which carbon nanotubes are uniformly dispersed in the dispersion medium may be prepared.

Specifically, in the conductive material dispersed liquid according to an embodiment of the present invention, the carbon nanotubes and dispersant may be dispersed and included in the form of a carbon nanotubes-dispersant composite in which the dispersant is introduced to the surface of the carbon nanotube through a physical or chemical bond.

More specifically, the composite in the conductive material dispersed liquid may be distributed such that particle size distribution $D_{99}$ is 100 μm or less, more specifically in the range of 20 to 70 μm, and more specifically in the range of 30 to 50 μm.

The particle size distribution $D_{99}$ of the composite may be defined as a particle size on the basis of 99% of the particle size distribution. Further, the particle size distribution $D_{99}$ of the composite may be measured using, for example, a laser diffraction method, and more specifically, the composite may be dispersed in a solvent and then introduced into a commercially available laser diffraction particle size analyzer (e.g., Microtrac MT 3000) to irradiate ultrasound of about 28 kHz at an output of 60 W, and then the average particle size ($D_{99}$) on the basis of 99% of the particle size distribution in the measuring device may be calculated.

Further, in the conductive material dispersed liquid according to an embodiment of the present invention, the solid content including the composite may be in the range of 1 to 43 wt % based on the total weight of the dispersed liquid. As such, the conductive material dispersed liquid according to an embodiment of the present invention can exhibit high solid-like properties due to having higher solid content compared with conventional liquid, and thereby can improve the coating properties and coating stability of the composition for forming an electrode.

As such, the conductive material dispersed liquid according to the present invention can exhibit excellent electrical, thermal and mechanical properties due to uniform dispersion of carbon nanotubes and high solid-like properties, and workability is improved due to maintenance of low viscosity, and thus the conductive material dispersed liquid may be applied and practically used in various fields. Specifically, the conductive material dispersed liquid may be used for production of electrodes for lithium secondary batteries.

According to another embodiment of the present invention, there are provided a composition for forming an electrode for a lithium secondary battery which includes the above-described conductive material dispersed liquid together with an electrode active material, and an electrode for a lithium secondary battery prepared using the composition.

Specifically, the composition for forming an electrode of a lithium secondary battery includes the conductive material dispersed liquid, electrode active material, and binder, and specifically, may have a phase angle of 15° to 35° when measured by a rheometer at a frequency of 1 Hz.

When the phase angle of the composition for forming an electrode of a lithium secondary battery is within the above-described range, an electrode active material layer having a uniform thickness can be formed with no concern for occurrence of cracks and collapse of the electrode active material layer. Considering the significant effect of improving the electrode formability and coating stability according to control of the phase angle of the composition for forming an electrode of a lithium secondary battery, the phase angle of the electrode composition may be in the range of 20° to 32°.

The phase angle of the composition for forming an electrode of a lithium secondary battery may be realized by controlling the content of the conductive material dispersed liquid forming the composition and the type, physical properties and mixing ratio of the electrode active material, binder, and solvent.

Specifically, in the composition for forming an electrode of a lithium secondary battery, the conductive material dispersed liquid may be included in an amount of 1 to 50 wt % based on the total weight of the composition for forming an electrode of a lithium secondary battery. When the content of the conductive material dispersed liquid is less than 1 wt %, output characteristics of batteries may be lowered due to a decrease in conductivity and an increase in resistance in an electrode active material layer. When the content exceeds 50 wt %, capacity characteristics may be deteriorated due to a relative decrease in the content of the active material.

In the composition for forming an electrode of a lithium secondary battery, the electrode active material may usually be the materials used as a positive or negative electrode active material of a lithium secondary battery.

Specifically, when the composition for forming an electrode of a lithium secondary battery is a composition for forming a positive electrode, the electrode active material is a compound capable of reversibly intercalating and deintercalating lithium (a lithiated intercalation compound), and specifically, may include a lithium composite metal oxide including one or more metals such as cobalt, manganese, nickel, or aluminum, and lithium.

More specifically, examples of the lithium composite metal oxide include lithium-manganese-based oxides such as $LiMnO_2$, $LiMn_2O$ and the like, lithium-cobalt oxides such as $LiCoO_2$, lithium-nickel-based oxides such as $LiNiO_2$, lithium-nickel-manganese-based oxides such as $LiNi_{1-Y1}Mn_{Y1}O_2$ (where $0<Y1<1$), $LiNi_{Z1}Mn_{2-Z1}O_4$ (where $0<Z1<2$) and the like, lithium-nickel-cobalt-based oxides such as $LiNi_{1-Y2}Co_{Y2}O_2$ (where $0<Y2<1$) and the like, lithium-manganese-cobalt-based oxides such as $LiCo_{1-Y3}Mn_{Y3}O_2$ (where $0<Y3<1$), $LiMn_{2-Z2}Co_{Z2}O_4$ (where $0<Z2<2$) and the like, lithium-nickel-cobalt-manganese-based oxides such as $Li(Ni_{P1}Co_{Q1}Mn_{R1})O_2$ (where $0<P1<1$, $0<Q1<1$, $0<R1<1$, $P1+Q1+R1=1$), $Li(Ni_{P2}Co_{Q2}Mn_{R2})O_4$ (where $0<P2<2$, $0<Q2<2$, $0<R2<2$, $P2+Q2+R2=2$) and the like, or oxides of lithium-nickel-cobalt-manganese-other metals (M) such as $Li(Ni_{P3}Co_{Q3}Mn_{R3}M1_S)O_2$ (wherein M1 is selected from the group consisting of Al, Cu, Fe, V, Cr, Ti, Zr, Zn, Ta, Nb, Mg, B, W and Mo, P3, Q3, R3, and S each independently represent atom fractions of elements, where $0<P3<1$, $0<Q3<1$, $0<R3<1$, $0<S<1$, and $P+Q+R+S=1$) and the like, and any one or two or more compounds thereof may be included.

Further, in the lithium composite metal oxide, at least one of the metal elements other than lithium may be doped with one or two or more elements selected from the group consisting of Al, Cu, Fe, V, Cr, Ti, Zr, Zn, Ta, Nb, Mg, B, W, and Mo. As such, when the lithium composite metal oxide except for lithium is further doped with the metal element, the structural stability of the positive electrode active material is improved, and thereby the output characteristics of the battery can be improved. Here, the content of the doped elements included in the lithium composite metal oxide may be suitably adjusted to be within the range in which the properties of the positive electrode active material are not deteriorated, and specifically, may be 0.02 atom % or less.

More specifically, in the positive electrode active material according to an embodiment of the present invention, the lithium composite metal oxide may include the compound of the following Formula 1.

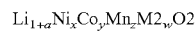  [Formula 1]

(in Formula 1, M2 may include one or two or more elements selected from the group consisting of Al, Cu, Fe, V, Cr, Ti, Zr, Zn, Ta, Nb, Mg, B, W, and Mo, and a, x, y, z and w each independently represent an atom fraction of the corresponding element, where $-0.5 \leq a \leq 0.5$, $0 \leq x \leq 1$, $0 \leq y \leq 1$, $0 \leq z \leq 1$, $0 \leq w \leq 1$ and $0 < x+y+z \leq 1$)

Considering the significant improvement effect of mixing the conductive material and binder, the positive electrode active material may include a lithium composite metal oxide of Formula 1 in which $0<x<1$, $0<y<1$, $0<z<1$ and $y+z \leq x$.

Among the above-described compounds, in terms of improving the capacity characteristics and stability of the battery, the lithium composite metal oxide may be more specifically $LiCoO_2$, or a lithium nickel manganese cobalt oxide such as $Li(Ni_{0.6}Mn_{0.2}Co_{0.2})O_2$, $LiNi_{0.5}Mn_{0.3}Co_{0.2}O_2$, $LiNi_{0.8}Mn_{0.1}Co_{0.1}O_2$, and the like. Further, considering the significant improvement effect from controlling the type and content ratio of the constituent elements forming the lithium composite metal oxide, the lithium composite metal oxide may be $LiNi_{0.6}Mn_{0.2}Co_{0.2}O_2$, $LiNi_{0.5}Mn_{0.3}Co_{0.2}O_2$, $LiNi_{0.7}Mn_{0.15}Co_{0.15}O_2$, $LiNi_{0.8}Mn_{0.1}Co_{0.1}O_2$, or the like, and may include one or a mixture of two or more thereof.

Further, when the composition for forming an electrode of a lithium secondary battery is a composition for forming a negative electrode, the electrode active material is a compound capable of reversibly intercalating and deintercalating lithium, and may be a negative electrode active material of carbonaceous materials such as artificial graphite, natural graphite, graphitized carbon fiber and amorphous carbon; metal compounds capable of alloying with lithium, such as Si, Al, Sn, Pb, Zn, Bi, In, Mg, Ga, Cd, Si alloys, Sn alloys, or Al alloys; a metal oxide capable of doping and dedoping lithium such as $SiO_x$ ($0<x<2$), $SnO_2$, vanadium oxide, and lithium vanadium oxide; or composites including the metal compound and the carbonaceous material such as a Si—C composite or a Sn—C composite, and one or a mixture of two or more thereof may be used. Further, a metal lithium thin film may be used as the negative electrode active material. Further, both low-crystalline carbon and highly-crystalline carbon may be used as the carbon material. Typical examples of the low-crystalline carbon include soft carbon and hard carbon, and typical examples of the highly-crystalline carbon include amorphous, platy, scaly, spherical, and fibrous natural graphite and artificial graphite, kish graphite, pyrolytic carbon, mesophase pitch based carbon fiber, meso-carbon microbeads, mesophase pitches, and high-temperature calcined carbon such as petroleum or coal tar pitch-derived cokes.

The electrode active material may be contained in an amount of 70 to 99.5% by weight with respect to the total weight of the composition for forming an electrode of a lithium secondary battery based on solid content. When the content of the electrode active material is less than 70 wt %, the capacity may decrease. When the content exceeds 99.5 wt %, adhesive strength to an electrode current collector is lowered, and conductivity is reduced due to a decrease in the relative content of the binder and the conductive material.

Further, the composition for forming an electrode of a lithium secondary battery may further include a binder to enhance adhesion between the electrode active material particles and adhesive strength between the electrode active material and the current collector.

Specific examples of the binder include polyvinylidene fluoride (PVDF), a polyvinylidene fluoride-hexafluoropropylene copolymer (PVDF-co-HFP), polyvinyl alcohol, polyacrylonitrile, carboxymethylcellulose (CMC), starch, hydroxypropylcellulose, regenerated cellulose, polyvinylpyrrolidone, tetrafluoroethylene, polyethylene, polypropylene, an ethylene-propylene-diene monomer (EPDM), a sulfonated EPDM, styrene butadiene rubber (SBR), fluorine rubber, or various copolymers thereof, and one or a mixture of two or more thereof may be used. The binder may be included in an amount of 0.09 to 30 wt % based on the total weight of the composition for forming an electrode.

Further, the composition for forming an electrode of a lithium secondary battery may further include a solvent for mixing and dispersing the above-described electrode active material, binder, and the like.

The solvent may be any solvent commonly used in the related filed, and examples thereof include dimethyl sulfoxide (DMSO), isopropyl alcohol, N-methylpyrrolidone (NMP), acetone, water, or the like, and one or a mixture of two or more thereof may be used. The amount of the solvent used may be sufficient to have a viscosity capable of exhibiting excellent thickness uniformity when the electrode active material and the binder are dissolved or dispersed and then applied to produce an electrode, in consideration of the application thickness of the slurry and the production yield.

Meanwhile, the electrode according to an embodiment of the present invention which is prepared by using the composition for forming an electrode of a lithium secondary battery, may be a positive electrode or a negative electrode, particularly, a positive electrode.

The electrode may be prepared by a conventional method except that the electrode active material layer is formed using the composition for forming an electrode of a lithium secondary battery. Specifically, the electrode may be produced by applying the composition for forming an electrode to a current collector and drying, or laminating a film obtained by casting the composition for forming an electrode of a lithium secondary battery on a separate support and then peeling off the composition from the support on a current collector.

The current collector is not particularly limited as long as it has electrical conductivity without causing chemical changes in the battery, and examples thereof include copper, stainless steel, aluminum, nickel, titanium, calcined carbon, or aluminum or stainless steel having a surface treated with carbon, nickel, titanium, silver, or the like. Further, the current collector may generally have a thickness in the range of 3 to 500 μm, and adhesive strength of the positive electrode active material can be increased by forming fine irregularities on the surface of the current collector. For example, the current collector may be used in various forms such as a film, a sheet, a foil, a net, a porous material, a foam, a nonwoven fabric, etc.

According to still another embodiment of the present invention, there is provided a lithium secondary battery including the electrode.

Specifically, the lithium secondary battery includes a positive electrode, a negative electrode positioned opposite the positive electrode, a separator interposed between the positive electrode and the negative electrode, and an electrolyte. At least one of the positive electrode and the negative electrode may be prepared using the electrode composition including the conductive material dispersed liquid. Further, selectively, the lithium secondary battery may further include a battery container for storing an electrode assembly of the positive electrode, negative electrode, and separator, and a sealing component for sealing the battery container.

Further, in the lithium secondary battery, a separator separates the negative electrode and the positive electrode and provides a passage for lithium ions. Any separator may be used without particular limitation as long as it is used as a separator in a lithium secondary battery, and particularly, a separator having low resistance to electrolyte ion migration and excellent electrolyte wettability is preferred. Specifically, a porous polymer film, for example a porous polymer film formed of a polyolefin-based polymer such as an ethylene homopolymer, a propylene homopolymer, an ethylene/butene copolymer, an ethylene/hexene copolymer and an ethylene/methacrylate copolymer, or a laminated structure of two or more thereof may be used. Further, nonwoven fabrics formed of conventional porous nonwoven fabrics such as high-melting-point glass fibers, polyethylene terephthalate fibers and the like may be used. Furthermore, a coated separator containing a ceramic component or a polymer material may be used to ensure heat resistance or mechanical strength, and may be selectively used in a single layer or a multi-layer structure.

Further, examples of the electrolyte used in the present invention include organic liquid electrolytes, inorganic liquid electrolytes, solid polymer electrolytes, gel-type polymer electrolytes, solid inorganic electrolytes, molten inorganic electrolytes, and the like which are usable in the production of lithium secondary batteries, but are not limited thereto.

Specifically, the electrolyte may include organic solvents and lithium salts.

As the organic solvent, any organic solvent may be used without particular limitation as long as it can act as a medium through which ions involved in the electrochemical reaction of the battery can move. Specific examples of the organic solvent include ester-based solvents such as methyl acetate, ethyl acetate, γ-butyrolactone, ε-caprolactone, and the like; ether-based solvents such as dibutyl ether or tetrahydrofuran; ketone-based solvents such as cyclohexanone; aromatic hydrocarbon-based solvents such as benzene and fluorobenzene; carbonate-based solvents such as dimethylcarbonate (DMC), diethylcarbonate (DEC), methylethylcarbonate (MEC), ethylmethylcarbonate (EMC), ethylene carbonate (EC), propylene carbonate (PC), and the like; alcohol-based solvents such as ethyl alcohol and isopropyl alcohol; nitriles such as R—CN (R is a linear, branched or cyclic hydrocarbon group having 2 to 20 carbon atoms, which may include a double bond aromatic ring or ether bond); amides such as dimethylformamide; dioxolanes such as 1,3-dioxolane; sulfolanes, etc. Among these, a carbonate-based solvent is preferred, and a mixture of a cyclic carbonate (e.g., ethylene carbonate or propylene carbonate) having high ionic conductivity and a high dielectric constant capable of increasing the charging/discharging performance of the battery and a linear carbonate-based compound having low viscosity (e.g., ethylmethyl carbonate, dimethyl carbonate or diethyl carbonate) is more preferred. In this case, when a cyclic carbonate and a chain carbonate are mixed in a volume ratio of about 1:1 to 1:9, the performance of the electrolyte may be excellent.

The lithium salt may be used without particular limitation as long as it is a compound capable of providing lithium ions used in a lithium secondary battery. Specific examples of the lithium salt include $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, $LiB(C_2O_4)_2$, etc. The concentration of the lithium salt used is preferably in the range of 0.1 to 2.0 M. When the concentration of the lithium salt is within the above-described range, the electrolyte has suitable conductivity and viscosity, and thus can exhibit excellent electrolyte performance and allow lithium ions to move efficiently.

In addition to the electrolyte compositions, for example, the electrolyte may include one or more additives such as a haloalkylene carbonate-based compound such as difluoroethylene carbonate, pyridine, triethylphosphite, triethanolamine, cyclic ethers, ethylenediamine, n-glyme, hexamethylenetetramine, nitrobenzene derivatives, sulfur, quinone imine dyes, N-substituted oxazolidinones, N,N-substituted imidazolidine, ethylene glycol dialkyl ether, ammonium salts, pyrrole, 2-methoxyethanol, aluminum trichloride, and the like for the purpose of improving the lifetime characteristics of the battery, suppressing the reduction of battery capacity, and improving the discharge capacity of the battery. Here, the additive may be included in an amount of 0.1 to 5 wt % based on the total weight of the electrolyte.

A lithium secondary battery including an electrode prepared using the conductive material dispersed liquid according to the present invention as described above can stably exhibit excellent discharge capacity, output characteristics and an excellent capacity retention ratio due to uniform dispersion of the conductive material in the electrode. As a result, the lithium secondary battery is useful in the fields of portable devices such as cellular phones, notebook computers, digital cameras, and the like, and electric vehicles such as hybrid electric vehicles (HEV).

Therefore, according to yet another embodiment of the present invention, there are provided a battery module including the lithium secondary battery as a unit cell and a battery pack including the battery module.

The battery module or battery pack may be used as a power supply in one or more of medium- to large-sized devices such as a power tool; electric cars including an electric vehicle (EV), a hybrid electric vehicle, and a plug-in hybrid electric vehicle (PHEV); or a power storage system.

MODES OF THE INVENTION

Now, the present invention will be described in more detail with reference to the following examples. These examples are provided only for illustration of the present invention and should not be construed as limiting the scope and spirit of the present invention.

Example 1-1: Preparation of Bundle-Type Carbon Nanotubes 2,424 g of $Co(NO_3)_2 \cdot 6H_2O$ and $NH_4VO_3$ (Co/V, a molar ratio of 10:1) as precursor materials of Co and V was added to 2,000 ml of water, and thereby a clear aqueous solution was prepared in a flask A.

Separately, 2,000 g of an α-alumina support obtained by primary calcination of aluminum hydroxide $(Al(OH)_3)$ as an aluminum-based support precursor at 500° C. for 4 hours was prepared in a flask B.

4,424 g of the flask A solution was added to the flask B such that Co/V (a molar ratio of 10:1) was 30 mol when 2,000 g of the alumina support was converted into 100 on a molar basis. Further, citric acid was added such that Co was 23 mol with respect to 1 mol of citric acid, and the weight of the resultant mixture was weighed and aged while stirring for 5 minutes in a 60° C. thermostat to sufficiently support the graphite catalyst metal precursor. While maintaining the above temperature, the aged mixture was vacuum-dried while rotating at 80 rpm and the weight thereof after drying was measured to determine the moisture removal amount (about 14.1 wt %). The resultant dried reaction product was subjected to secondary calcination at 700° C. for 4 hours to prepare a supported catalyst.

Carbon nanotubes were synthesized in a laboratory-scale fixed-bed reactor using the supported catalyst for s synthesis of carbon nanotubes prepared as above. The supported catalyst for synthesis of carbon nanotubes thus prepared was mounted on a central portion of a quartz tube having an inner diameter of 55 mm heated to 670° C. in a nitrogen atmosphere, and then the temperature was maintained. Thereafter, the reaction was performed for 1 hour while a mixture gas of nitrogen, hydrogen, and ethylene at a mixing volume ratio of 1:1:1 was allowed to flow at a rate of 180 ml/min, and thereby bundle type carbon nanotubes were synthesized.

Comparative Example 1-1

Entangled-type carbon nanotubes (manufactured by Cnano Technology Ltd.) were used.

Experimental Example 1-1

The shape of the secondary structure, average strand diameter, average strand diameter and average length of the carbon nanotube unit (CNT unit), a BET specific area, a bulk density and a true density of bundle-type carbon nanotubes of Example 1-1 and entangled-type carbon nanotubes of Comparative Example 1-1 each were measured in the following manner, and the results are shown in the following Table 1.

1) The shape of the secondary structure and particle size: the particle size and the shape of the secondary structure of the CNT were observed using a scanning electron microscope (SEM).

2) Average diameter of CNT unit: the average diameter of a carbon nanotube unit was measured using an SEM and BET.

3) Average length of CNT unit: the average length of a carbon nanotube unit was measured using an SEM.

4) BET specific surface area: the BET specific surface area was calculated from the adsorption amount of nitrogen gas at a liquid nitrogen temperature (77 K) using BEL-SORP-mini II manufactured by BEL JAPAN, INC.

5) Bulk density; the powder was filled in a 25 ml container whose weight was known, the weight was measured, and the density was converted by the following Equation 1.

Bulk density $(kg/m^3)$=Weight of carbon nanotubes (kg)/Volume of carbon nanotubes $(m^3)$ [Equation 1]

6) True density: the true density was measured using a pycnometer (AccuPyc II 1340).

TABLE 1

| | Example 1-1 | Comparative Example 1-1 |
|---|---|---|
| Shape of secondary structure | Bundle-type | Entangled-type |
| Average diameter (nm) of CNT unit | 12 | 12 |
| Average length (μm) of CNT unit | 30 | 5 |
| BET specific area $(m^2/g)$ | 249 | 197 |
| Bulk density $(kg/m^3)$ | 23 | 53 |
| True density $(kg/m^3)$ | 1,937 | 1,894 |

Examples 2-1 and 2-2, and Comparative Examples 2-1 to 2-3 PREPARATION OF CONDUCTIVE MATERIAL DISPERSED LIQUID Compositions, shown in the following Table 2, containing 5 wt % of the carbon nanotubes, 1.0 wt % of the dispersant, and 94 wt % of the dispersion medium based on the total weight of the composition were mixed for 60 minutes using a homogenous mixer (VMA LC55, Impeller/3,000 rpm). The resultant mixture was circulated for a period of time shown in the following Table 2 using a bead mill (NETZ-SCH Mini-cer, bead size: 1 mm/3,000 rpm) to obtain the conductive material dispersed liquids including bundle-type carbon nanotubes of Examples 2-1 and 2-2, and Comparative Examples 2-1 to 2-3.

TABLE 2

| Classification | Carbon nanotubes | Dispersant | Dispersion medium | Milling time |
|---|---|---|---|---|
| Example 2-1 | Example 1-1 | H-NBR | NMP | 60 minutes |
| Example 2-2 | Example 1-1 | H-NBR | NMP | 90 minutes |
| Comparative Example 2-1 | Example 1-1 | H-NBR | NMP | 30 minutes |
| Comparative Example 2-2 | Example 1-1 | H-NBR | NMP | 45 minutes |
| Comparative Example 2-3 | Comparative Example 1-1 | H-NBR | NMP | 60 minutes |

※ H-NBR: content of partially hydrogenated nitrile butadiene-based rubber (content of structural unit derived from hydrogenated 1,3-butadiene: 63 wt %, content of structural unit derived from acrylonitrile: 37 wt %, molecular weight: 260,000 g/mol, polydispersity index (PDI) = 2.9)
NMP: N-methylpyrrolidone Experimental Example 2-1

The phase angles of the conductive material dispersed liquids of Examples 2-1 and 2-2, and Comparative Examples 2-1 to 2-3 were measured.

Specifically, the phase angle was measured by performing frequency sweeping at a frequency of 1 Hz while applying a stress of 1% at room temperature using a dynamic shear rheometer (DSR). The results are shown in the following Table 3 and FIG. 1. The x-axis represents a phase angle, and the y-axis represents a complex elastic modulus in FIG. 1.

TABLE 3

| | phase angle (°) | |G*| (Pa) |
|---|---|---|
| Example 2-1 | 13.7 | 290.2 |
| Example 2-2 | 7.3 | 244.55 |
| Comparative Example 2-1 | 23.1 | 2,190.3 |
| Comparative Example 2-2 | 18.5 | 1,131.5 |
| Comparative Example 2-3 | 24.8 | 80.5 |

As a result of measurement, the phase angles of conductive material dispersed liquids of Examples 2-1 and 2-2 were respectively 13.7° and 7.3°. However, the phase angles of conductive material dispersed liquids of Comparative Example 2-1 to 2-3 were respectively 23.1°, 18.5° and 24.8°. Accordingly, it was found that the conductive material dispersed liquids of Examples 2-1 and 2-2 had higher solid-like properties that those of Comparative Examples 2-1 to 2-3.

Experimental Example 2-2

The particle size distribution and the content of the conductive material of conductive material dispersed liquids of Examples 2-1 and 2-2, and Comparative Examples 2-1 to 2-3 each were measured. The results are shown in the following Table 4.

※ Particle size distribution: samples were introduced into a commercially available laser diffraction particle size analyzer (Microtrac MT 3000) to irradiate ultrasound of about 28 kHz at an output of 60 W, and then each average particle size $D_{99}$ on the basis of 99% of the particle size distribution in the measuring device was calculated.

TABLE 4

| Classification | $D_{99}$ (μm) | Content of conductive material in dispersed liquid (wt %) |
|---|---|---|
| Example 2-1 | 41 | 5.0 |
| Example 2-2 | 34 | 5.0 |
| Comparative Example 2-1 | 75 | 5.0 |
| Comparative Example 2-2 | 55 | 5.0 |
| Comparative Example 2-3 | 25 | 5.0 |

Generally, a conductive material dispersed liquid containing entangled-type carbon nanotubes shows smaller particle size distribution compared to that of a conductive material dispersed liquid containing bundle-type carbon nanotubes. Accordingly, the particle size distribution of the carbon nanotube-dispersant composites in the conductive material dispersed liquids of Examples 2-1 and 2-2 was higher than that of the conductive material dispersed liquid of Comparative Example 2-3, but was significantly lower than those of the conductive material dispersed liquids of Comparative Examples 2-1 and 2-2 containing bundle-type carbon nanotubes in the same manner.

Examples 3-1 and 3-2, and Comparative Examples 3-1 to 3-3: Preparation of Composition for Forming Positive Electrode 16.8 wt % of the conductive material dispersed liquid, 81.5 wt % of the positive electrode active material, and 1.7 wt % of the binder shown in the following Table 5 based on the total amount of the composition were mixed to prepare compositions for forming a positive electrode of Examples 3-1 and 3-2, and Comparative Examples 3-1 to 3-3.

TABLE 5

| Classification | Conductive material dispersed liquid | Positive electrode active material | Binder |
|---|---|---|---|
| Example 3-1 | Example 2-1 | $LiNi_{0.6}Mn_{0.2}Co_{0.2}O_2$ | PVdF |
| Example 3-2 | Example 2-2 | $LiNi_{0.6}Mn_{0.2}Co_{0.2}O_2$ | PVdF |
| Comparative Example 3-1 | Comparative Example 2-1 | $LiNi_{0.6}Mn_{0.2}Co_{0.2}O_2$ | PVdF |
| Comparative Example 3-2 | Comparative Example 2-2 | $LiNi_{0.6}Mn_{0.2}Co_{0.2}O_2$ | PVdF |
| Comparative Example 3-3 | Comparative Example 2-3 | $LiNi_{0.6}Mn_{0.2}Co_{0.2}O_2$ | PVdF |

※ PVdF: polyvinylidene fluoride

Experimental Example 3-1

The phase angles of the compositions for forming a positive electrode of Examples 3-1 and 3-2, and Comparative Examples 3-1 to 3-3 were measured.

Figure 2:
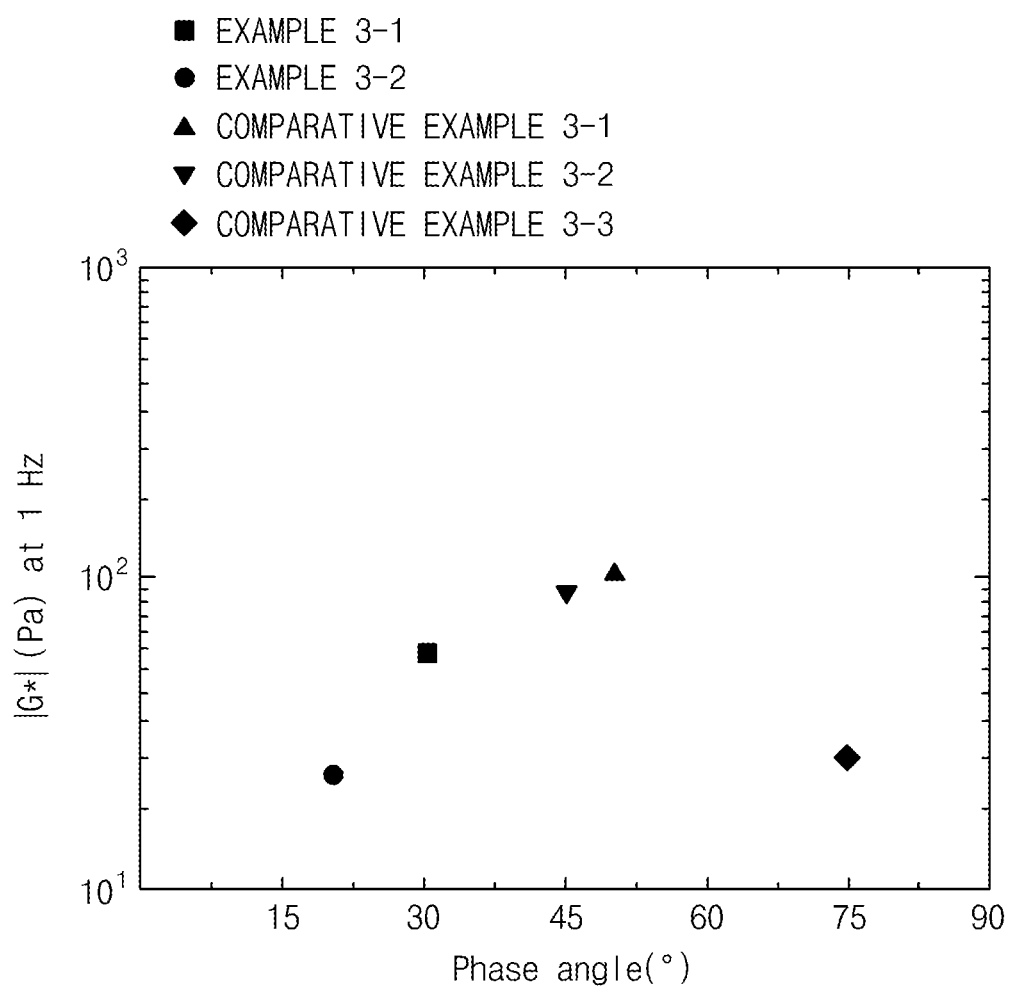
FIG. 2 is a graph of observing a phase angle of conductive material dispersed liquids of Examples 3-1 and 3-2, and Comparative Examples 3-1 to Comparative Example 3-3.

Specifically, the phase angle was measured by performing frequency sweeping at a frequency of 1 Hz while applying a stress of 1% at room temperature using a dynamic shear rheometer (DSR). The results are shown in the following Table 6 and FIG. 2. The x-axis represents a phase angle, and the y-axis represents a complex elastic modulus in FIG. 2.

TABLE 6

|  | phase angle (°) | |G*| (Pa) |
| --- | --- | --- |
| Example 3-1 | 30.3 | 57.3 |
| Example 3-2 | 20.4 | 23.4 |
| Comparative Example 3-1 | 50.2 | 102.7 |
| Comparative Example 3-2 | 45.1 | 89.1 |
| Comparative Example 3-3 | 75.0 | 26.5 |

The phase angles of compositions for forming a positive electrode of Examples 3-1 and 3-2 were respectively 30.3° and 20.4°. However, the phase angles of compositions for forming a positive electrode of Comparative Example 3-1 to 3-3 were respectively 50.2°, 45.1° and 75.0°. Accordingly, it was found that the compositions for forming a positive electrode of Examples 3-1 and 3-2 had higher solid-like properties that those of Comparative Examples 3-1 to 3-3.

Examples 4-1 and 4-2, and Comparative Examples 4-1 to 4-3: Preparation of Positive Electrode The compositions for forming a positive electrode shown in the following Table 7 were applied onto an aluminum current collector at a loading amount of 630 mg/25 cm², dried at 130° C., and roll-pressed to prepare positive electrodes of Examples 4-1 and 4-2, and Comparative Examples 4-1 to 4-3.

TABLE 7

| Classification | Composition for forming positive electrode |
| --- | --- |
| Example 4-1 | Example 3-1 |
| Example 4-2 | Example 3-2 |
| Comparative Example 4-1 | Comparative Example 3-1 |
| Comparative Example 4-2 | Comparative Example 3-2 |
| Comparative Example 4-3 | Comparative Example 3-3 |

Experimental Example 4-1

The positive electrodes of Examples 4-1 and 4-2, and Comparative Examples 4-1 to 4-3 were observed using a microscope. The results are shown in FIG. 3.

Figure 3:
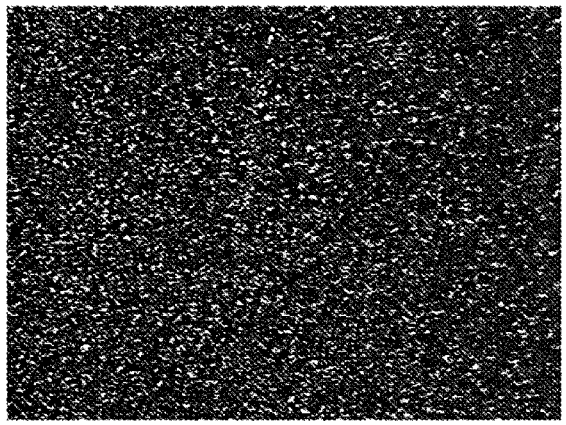
FIG. 3 is pictures of observing surfaces of the positive electrodes of Examples 4-1 and 4-2, and Comparative Examples 4-1 to Comparative Example 4-3 using a scanning electron microscope.
Figure 3:
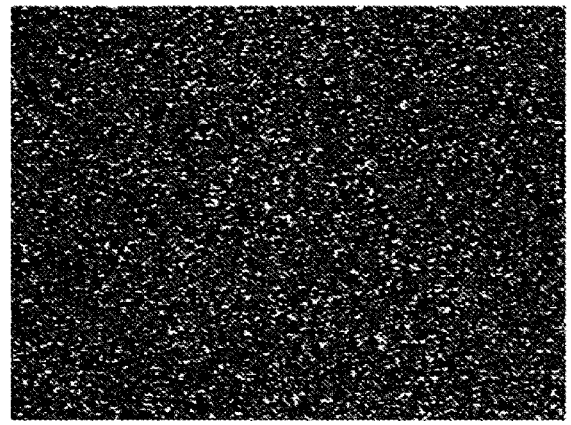
Figure 3:
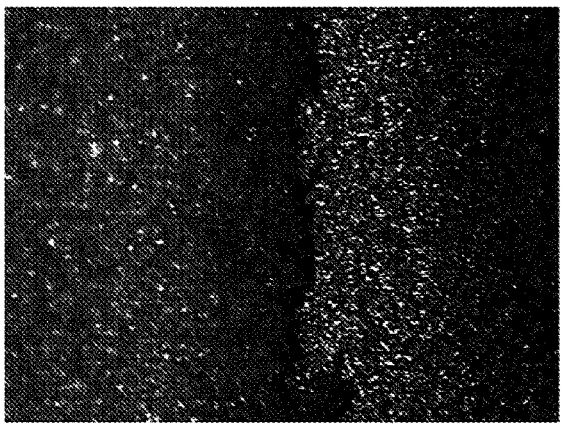
Figure 3:
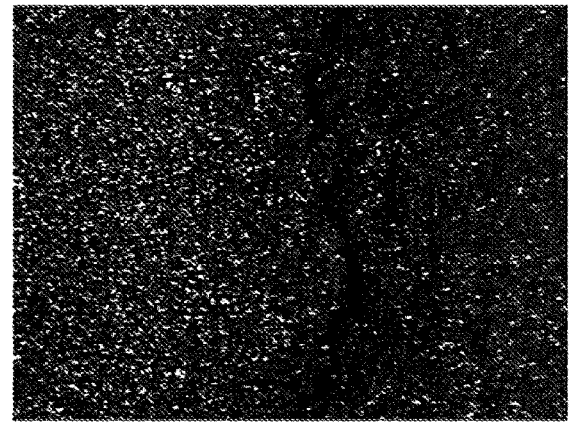
Figure 3:
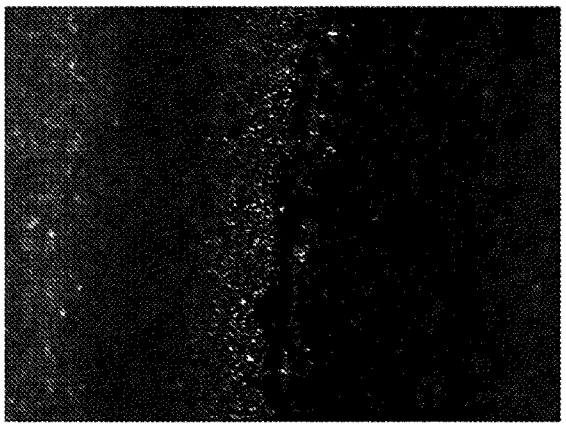

As shown in FIG. 3, cracks were not observed in the positive electrodes of Examples 4-1 and 4-2, but cracks were observed in the positive electrodes of Comparative Examples 4-1 to 4-3 after drying.

Examples 5-1 and 5-2, and Comparative Examples 5-1 TO 5-3: Preparation of Lithium Secondary Battery 353 g of a mixture containing natural graphite, a carbon black conductive material, carboxymethylcellulose (CMC), and a styrene butadiene rubber (SBR) binder in a weight ratio of 85:10:1:4 as a negative electrode active material was mixed with 250 ml of N-methylpyrrolidone to prepare a composition for forming a negative electrode, and the composition was applied onto a copper current collector at a loading amount of 300 mg/25 cm² to prepare a negative electrode.

An electrode assembly was prepared by interposing a porous polyethylene separator between the positive electrode shown in the following Table 8 and the negative electrode prepared above. The electrode assemblies were positioned in the case and an electrolyte was injected into the case to prepare lithium secondary batteries of Examples 5-1 and 5-2, and Comparative Examples 5-1 to Comparative Example 5-3. Here, the electrolyte was prepared by dissolving 1.0 M lithium hexafluorophosphate (LiPF$_6$) in an organic solvent including ethylene carbonate/dimethyl carbonate/ethyl methyl carbonate (volume ratio=3:4:3).

TABLE 8

| Classification | Positive electrode |
| --- | --- |
| Example 5-1 | Example 4-1 |
| Example 5-2 | Example 4-2 |
| Comparative Example 5-1 | Comparative Example 4-1 |
| Comparative Example 5-2 | Comparative Example 4-2 |
| Comparative Example 5-3 | Comparative Example 4-3 |

Experimental Example 5-1

The capacity characteristics per C-rate of the lithium secondary batteries of Examples 5-1 and 5-2, and Comparative Examples 5-1 to 5-3 were measured.

Specifically, each of the lithium secondary batteries was charged at room temperature (20 to 25° C.) to 4.25 V under a constant current of 0.1 C and then under a constant voltage of 4.25 V. The first charging was performed until the charged current reached 0.03 mAh. Then, each battery was allowed to stand for 20 minutes and discharged to 3.0 V under a constant current condition of 0.1 C. After initial charging and discharging, tests were carried out at room temperature under the constant current conditions of 0.2 C, 0.5 C, 1.0 C and 2.0 C. Each capacity per C-rate was expressed in percentage terms based on the capacity at 0.1 C. The results are shown in FIG. 4.

Figure 4:
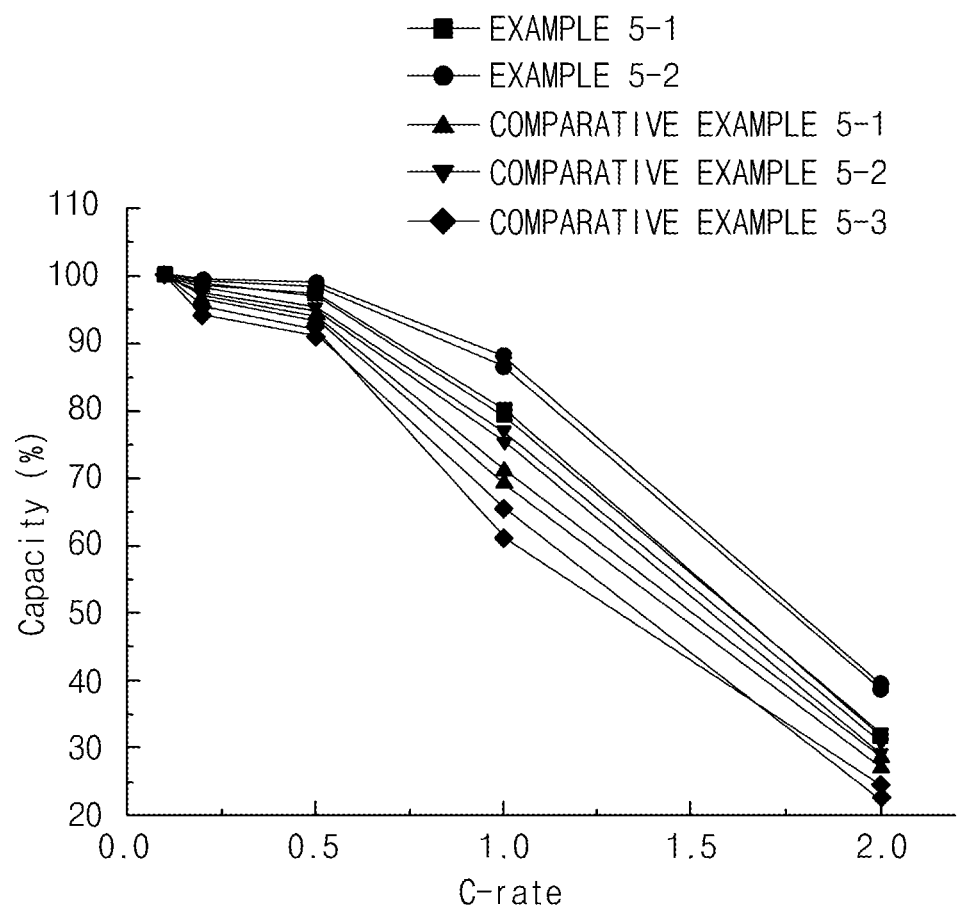
FIG. 4 is a graph showing a result of observing capacity characteristics per C-rate of lithium secondary batteries of Examples 5-1 and 5-2, and Comparative Examples 5-1 to Comparative Example 5-3.

As shown in FIG. 4, as a result of measurement of each capacity per C-rate, the lithium secondary batteries of Examples 5-1 and 5-2 had higher capacity than those of the lithium secondary batteries of Comparative Examples 5-1 to 5-3. Among these, the lithium secondary battery of Example 5-2 had the highest capacity.

The invention claimed is:

1. A conductive material dispersed liquid, comprising:
   a conductive material which includes bundle-type carbon nanotubes;
   a dispersant; and
   a dispersion medium,
   wherein a phase angle of the conductive material dispersed liquid is in a range of 3° to 18° when measured by a rheometer at a frequency of 1 Hz, and
   wherein the bundle-type carbon nanotubes have a ratio (TD/BD ratio) of a true density (TD) to a bulk density (BD) in a range of 70 to 100.

2. The conductive material dispersed liquid according to claim 1, wherein the carbon nanotubes include a carbon nanotube unit having an average strand diameter of 10 to 30 nm.

3. The conductive material dispersed liquid according to claim 1, wherein the carbon nanotubes are included at 1 to 33 wt % based on the total weight of the conductive material dispersed liquid.

4. The conductive material dispersed liquid according to claim 1, wherein the dispersant includes a nitrile butadiene-based rubber.

5. The conductive material dispersed liquid according to claim 1, wherein the dispersant includes a hydrogenated nitrile butadiene-based rubber comprising a structural unit derived from a hydrogenated conjugated diene at 20 to 80 wt % based on the total weight of the rubber.

6. The conductive material dispersed liquid according to claim 5, wherein the hydrogenated nitrile butadiene-based rubber includes a structural unit derived from α, β-unsaturated nitrile at 10 to 70 wt % based on the total weight of the rubber.

7. The conductive material dispersed liquid according to claim 5, wherein the hydrogenated nitrile butadiene-based rubber includes a partially hydrogenated nitrile butadiene-based rubber comprising a structural unit derived from a hydrogenated conjugated diene at 20 to 80 wt %; a structural unit derived from α, β-unsaturated nitrile at 10 to 70 wt %; and a structural unit derived from a conjugated diene at 1 to 15 wt % based on the total weight of the rubber.

8. The conductive material dispersed liquid according to claim 5, wherein the hydrogenated nitrile butadiene-based rubber has a weight average molecular weight of 10,000 to 700,000 g/mol and a polydispersity index of 2.0 to 6.0.

9. The conductive material dispersed liquid according to claim 1, wherein the dispersant is included at 1 to 50 parts by weight based on 100 parts by weight of the carbon nanotubes.

10. The conductive material dispersed liquid according to claim 1, wherein the dispersant is introduced into a surface of the carbon nanotubes to form a carbon nanotubes-dispersant composite, and the carbon nanotubes-dispersant composite has a particle size distribution $D_{99}$ of 100 μm or less and is included in an amount of 1 to 5 wt % based on the total weight of the dispersed liquid.

11. The conductive material dispersed liquid according to claim 1, wherein the dispersion medium is an amide-based organic solvent.

12. The conductive material dispersed liquid according to claim 1, wherein the conductive material dispersed liquid is used as a conductive material for an electrode of a lithium secondary battery.

13. A method of preparing the conductive material dispersed liquid according to claim 1, comprising mixing a conductive material which includes bundle-type carbon nanotubes, a dispersant, and a dispersion medium to form a mixture, and then milling the mixture such that a phase angle of the mixture is in a range of 3° to 18° when measured by a rheometer at a frequency of 1 Hz.

14. The method according to claim 13, wherein the milling is performed by a bead mill.

15. The method according to claim 14, wherein the milling is performed using a bead mill having an average diameter of 0.5 to 2 mm for 60 to 120 minutes.

16. A composition for forming an electrode of a lithium secondary battery, comprising:
an electrode active material;
a binder; and
the conductive material dispersed liquid according to claim 1.

17. The composition according to claim 16, wherein the conductive material dispersed liquid is included at 1 to 50 wt % based on the total weight of the composition for forming an electrode.

18. The composition according to claim 16, wherein the composition for forming an electrode of a secondary battery has a phase angle of 15° to 35° when measured by a rheometer at a frequency of 1 Hz.

19. An electrode for a lithium secondary battery, manufactured using the composition for forming an electrode according to claim 16.

20. A lithium secondary battery, comprising:
a positive electrode;
a negative electrode;
a separator; and
an electrolyte,
wherein at least one of the positive electrode and the negative electrode is the electrode for a lithium secondary battery according to claim 19.

* * * * *